(12) United States Patent
Kwon et al.

(10) Patent No.: US 8,442,593 B1
(45) Date of Patent: May 14, 2013

(54) MOBILE TERMINAL

(75) Inventors: Youngin Kwon, Seoul (KR); Giljae Lee, Seoul (KR); Wooyong Kwon, Seoul (KR); Hanseok Chae, Seoul (KR); Minjong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/561,769

(22) Filed: Jul. 30, 2012

(30) Foreign Application Priority Data

Mar. 16, 2012 (KR) .......................... 10-2012-0027213
Mar. 19, 2012 (KR) .......................... 10-2012-0027513

(51) Int. Cl.
*H04M 1/00* (2006.01)
(52) U.S. Cl.
USPC ...................... 455/566; 455/556.1; 455/556.2; 455/557; 455/575.1; 455/575.8; 455/575.4; 455/575.3
(58) Field of Classification Search .................. 455/566, 455/556.1, 556.2, 557, 575.1, 575.3, 575.8, 455/575.4
See application file for complete search history.

(56) References Cited

U.S. PATENT DOCUMENTS

| 8,342,325 | B2 * | 1/2013 | Rayner | 206/320 |
| 2010/0294938 | A1 * | 11/2010 | Alameh et al. | 250/342 |
| 2012/0103844 | A1 * | 5/2012 | Piedra et al. | 206/320 |

\* cited by examiner

*Primary Examiner* — Kwasi Karikari
(74) *Attorney, Agent, or Firm* — Birch, Stewart, Kolasch & Birch, LLP

(57) ABSTRACT

A mobile terminal including a case having electronic components loaded therein and having a perforated window formed on a front side; a touchscreen coupled with the case and having a front side exposed via the perforated window, the touchscreen being configured to output an image and to receive an input touch signal; a window layer coupled with the front side of the touchscreen, the window layer including a light transmitting part situated in front of an image output and touch input area of the touchscreen and an opaque window bezel disposed only on top and bottom sides of the light-transmittive part; and an elastic part within an inner surface of the case on both sides of the perforated window. Further, right and left end portions of the front side of the touchscreen contact the elastic part.

20 Claims, 11 Drawing Sheets

MOBILE TERMINAL

Pursuant to 35 U.S.C. §119(a), this application claims the benefit of earlier filing date and right of priority to Korean Application No. 10-2012-0027213, filed on Mar. 16, 2012 and Korean Application No. 10-2012-0027513, filed on Mar. 19, 2012, the contents of which are hereby incorporated by reference herein in their entirety.

BACKGROUND OF THE INVENTION

1. Field of the Invention

The present invention relates to a mobile terminal. Although the present invention is suitable for a wide scope of applications, it is particularly suitable for increasing a size of a display unit by omitting right and left window bezels of the display unit.

2. Discussion of the Related Art

Generally, terminals can be classified into mobile terminals and stationary terminals. In addition, the mobile terminals can be further classified into handheld terminals and vehicle mount terminals.

A mobile terminal can also perform various functions such as data and voice communications, capturing images and video via a camera, recording audio, playing music files and outputting music via a speaker system, and displaying images and video on a display. There are ongoing efforts to support and increase the functionality of mobile terminals. Such efforts include software and hardware improvements, as well as changes and improvements in the structural components which form the mobile terminal.

Because the mobile terminal is small in size, the displaying of information is more difficult. There are also several other disadvantages to the small display size.

SUMMARY OF THE INVENTION

Accordingly, one object of the present invention is directed to a mobile terminal that substantially obviates one or more problems due to limitations and disadvantages of the related art.

Another object of the present invention is to provide a mobile terminal, by which a size of a display unit can be increased by omitting right and left window bezels of the display unit and fixing a circumference of a touchscreen to a case.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a case having electronic components loaded therein, the case having a perforated window formed on a front side, a touchscreen coupled with the case to have a front side exposed via the perforated window, the touchscreen configured to output an image, the touchscreen configured to receive an input of a signal by a user's touch, a window layer coupled with the front side of the touchscreen, the window layer including a light transmitting part situated in front of an image output and touch input area of the touchscreen and an opaque window bezel provided to top and bottom sides of the light-transmittive part, and an elastic part within an inner surface of the case on both sides of the perforated window, wherein right and left end portions of the front side of the touchscreen are contacted with the elastic part.

In another aspect of the present invention, a mobile terminal according to another embodiment of the present invention may include a case having electronic components loaded therein, the case having a perforated window formed on a front side, a touchscreen inserted in the perforated window to have a front side exposed via the perforated window, the touchscreen configured to output an image, the touchscreen configured to receive an input of a signal by a user's touch, a window layer inserted in the perforated window by being coupled with the front side of the touchscreen, the window layer including a light transmitting part situated in front of an image output and touch input area of the touchscreen and a window bezel covering a circumference of the light-transmittive part by being formed of an opaque material, and a screen holder coupled with a circumference of the touchscreen, the screen holder having an outer holder part extending outward to surpass the circumference of the touchscreen, wherein a top side of the outer holder part is contacted with an inner surface of the case on each of both sides of the perforated window.

According to at least one embodiment of the present invention, a window bezel provided to a lateral side to cover electrode lines and adhesive tapes of a related art touch panel is downsized or completely omitted. Therefore, a size of a display unit in a mobile terminal can be increased to be viewed by a user and a degree of freedom can be raised in aspect of design.

Effects obtainable from the present invention may be non-limited by the above mentioned effect. In addition, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
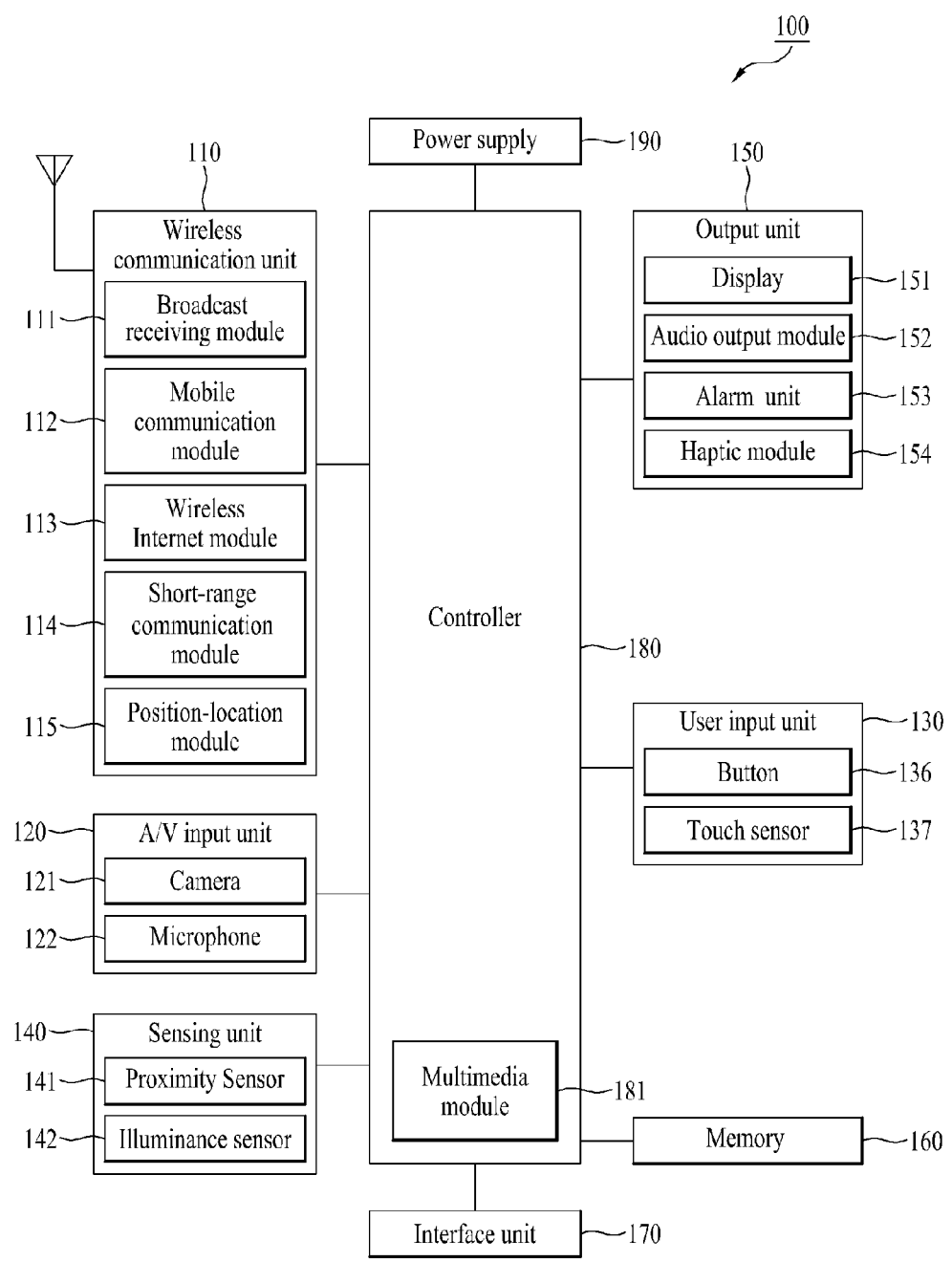
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. In addition, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 can precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 can calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. In addition, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. The user input unit 130 may include a button 136 and a touch sensor (static pressure/electrostatic) 137 provided to front/rear/lateral side of the mobile terminal 100. In addition, the user input unit 130 may further include a keypad, a dome switch, a jog wheel, a jog switch and the like (not shown in the drawing).

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. In addition, the sensing unit 140 can include a proximity sensor 141.

The output unit 150 generates outputs relevant to the senses of sight, hearing, touch and the like. In addition, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (WV-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user can see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it can use the display 151 as an input device as well as an output device. In this instance, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it can configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 can know whether a prescribed portion of the display 151 is touched.

Figure 2:
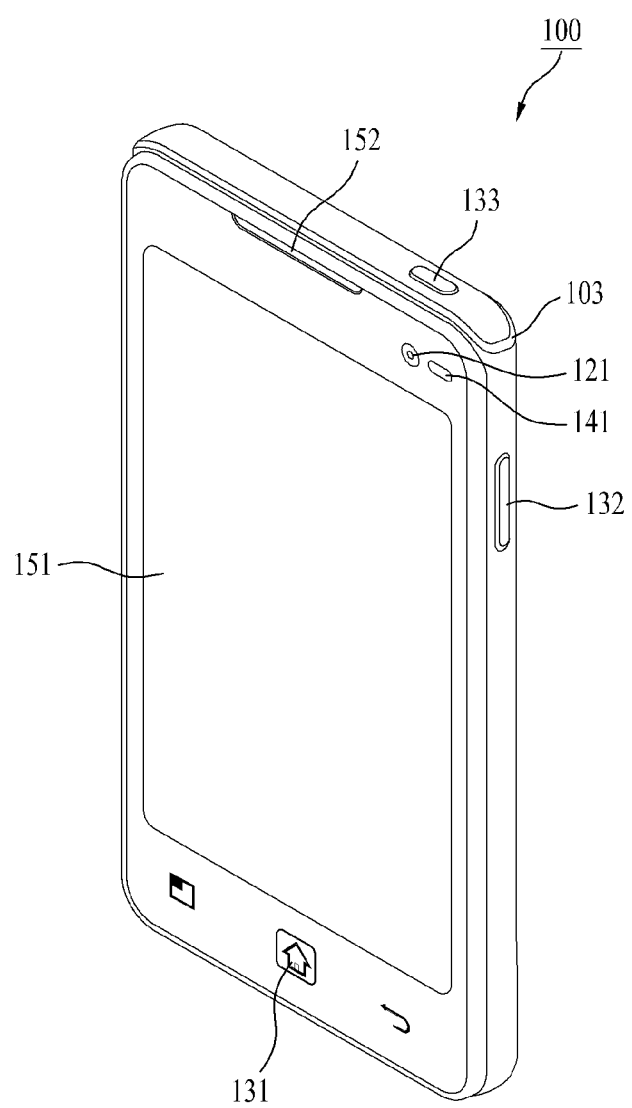
FIG. 2 is a front perspective diagram of a mobile terminal according to one embodiment of the present invention.

Referring to FIG. 2, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor 141 detects a proximity touch and a proximity touch pattern (e.g., a proximity touch distance, a proximity touch duration, a proximity touch position, a proximity touch shift state, etc.). In addition, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 can output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 can generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. In addition, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. In addition, the mobile terminal 100 can operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 can perform a pattern (or image) recognizing process for recognizing a writing input and a picture drawing input carried out on the touchscreen as characters or images, respectively.

The power supply unit 190 provides power required by the various components for the mobile terminal 100. The power may include internal power, external power, or combinations thereof. The power supply unit 190 may include a battery, a connecting port, a power supply control unit, a charge monitoring unit and the like for example.

The battery may include a built-in type chargeable battery. In addition, the battery may be detachably attached to the terminal body for a charging and the like. The connecting port may be configured a one example of an interface 170 to which an external charger is electrically connected to supply a power for the charging of the battery.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

NEXT, FIG. 2 is a front perspective diagram of the mobile terminal 100 according to one embodiment of the present invention. The mobile terminal 100 shown in the drawing has a bar type terminal body. However, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Figure 3:
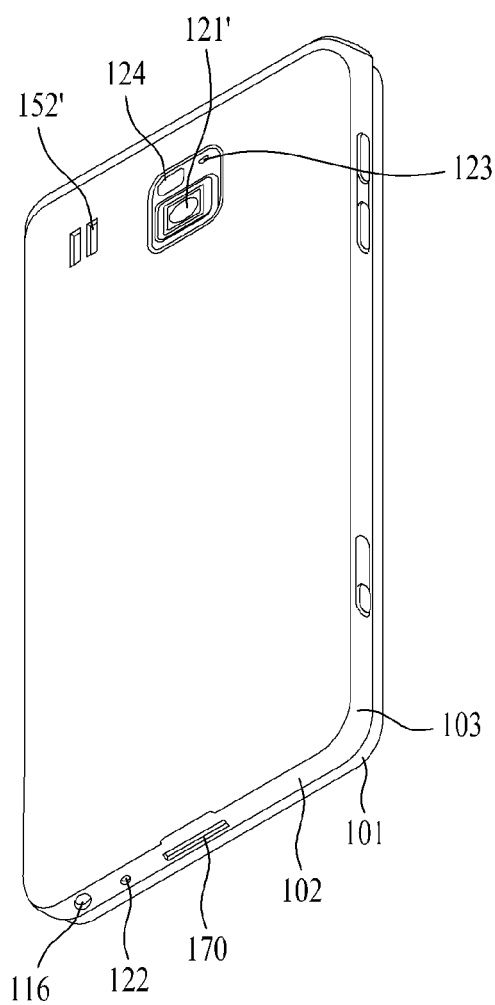
FIG. 3 is a rear perspective diagram of a mobile terminal according to one embodiment of the present invention.

Referring to FIG. 2, the mobile terminal 100 includes a case configuring an exterior thereof. In the present embodiment as shown in FIG. 3, the case can be divided into a front case 101 and a rear case 102. Various electric/electronic parts are loaded in a space provided between the front and rear cases 101 and 102.

Occasionally, electrical/electronic components may be loaded on a surface of the rear case 102 as well. The electrical/electronic components loaded on the surface of the rear case 102 may include such a detachable component as a battery, a USIM card, a memory card and the like. The rear case 102 may further be provided with a rear cover 103 configured to cover the surface of the rear case 102. The rear cover 103 is configured to facilitate its attachment/detachment to/from the rear case 102. If the rear cover 103 is detached from the rear case 103, the surface of the rear case 102 is exposed.

Figure 4:
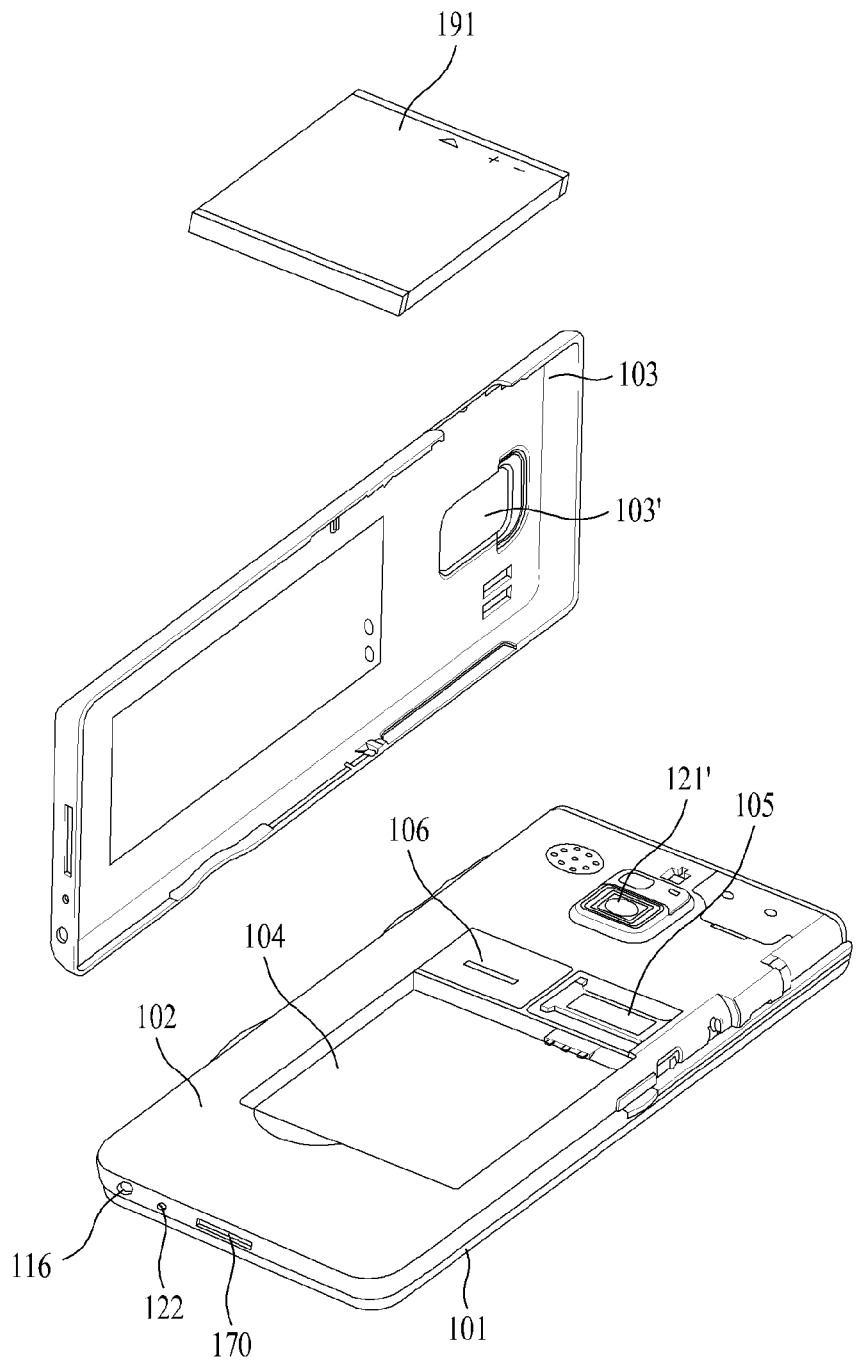
FIG. 4 is an exploded perspective diagram of a mobile terminal according to one embodiment of the present invention in view of a rear side.

If the rear cover 103 is attached to the rear case 102, as shown in FIGS. 2-4, a lateral side of the rear case 103 may be exposed in part. If a size of the rear cover 103 is decreased, a backside of the rear case 102 may be exposed in part as well. When the rear cover 103 covers a whole backside of the rear case 102, it may include an opening 103' configured to externally expose the camera 121 or the audio output unit 152.

The cases 101, 102 and 103 can be formed by injection molding of synthetic resin or can be formed of metal substance such as stainless steel (STS), titanium (Ti) or the like for example. As shown in FIG. 2, the display 151, audio output unit 152, camera 121, user input units 130/131 and 132, microphone 122 (FIG. 3), interface 170 (FIG. 3), proximity sensor 141 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. In addition, the input unit 130 can include a plurality of manipulating units 131, 132 and 133. The manipulating units 131, 132 and 133 can be named a manipulating portion and may adopt any mechanism of a tactile manner that enables a user to perform a manipulation action by experiencing a tactile feeling.

Content input by the first or second manipulating unit 131, 132 or 133 can be diversely set. For instance, such a command as start, end, scroll and the like is input to the first manipulating unit 131. In addition, a command for a volume adjustment of sound outputted from the audio output unit 152 and the like can be input to the second manipulating unit 132, a command for a switching to a touch recognizing mode of the display 151 and the like can be input to the second manipulating unit 133.

FIG. 3 is a perspective diagram of a backside of the terminal shown in FIG. 2. Referring to FIG. 3, a camera 121' can be additionally provided to a backside of the terminal body, and more particularly, to the rear case 102. The camera 121' has a photographing direction that is substantially opposite to that of the camera 121 shown in FIG. 2 and may have pixels differing from those of the camera 121.

Preferably, for instance, the camera 121 has low pixels enough to capture and transmit a picture of user's face for a video call, while the camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. When a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' can implement a stereo function together with the audio output unit 152 shown in FIG. 2 and may be used for implementation of a speakerphone mode in talking over the terminal.

A broadcast signal receiving antenna 116 can be additionally provided to the lateral side of the terminal body as well an antenna for communication or the like. The antenna 116 constructing a portion of the broadcast receiving module 111 shown in FIG. 1 can be retractably provided to the terminal body.

FIG. 4 is a perspective diagram of a mobile terminal according to one embodiment of the present invention, in which a surface of a rear case is shown by detaching a rear cover of the mobile terminal. Referring to FIG. 4, a mobile terminal according to one embodiment of the present invention includes the front case 101, rear case 102, rear cover (or a battery cover) 103, camera 121', interface 170, a battery 191, a battery loading part 104, a USIM card loading part 105, a memory card loading part 106, broadcasting antenna 116 and the like.

A space for receiving such an external component as the battery loading part 104, the USIM card loading part 105, the memory card loading part 106 and the like may be provided to a surface of the rear case 102. Generally, the external components mounted on the surface of the rear case 102 are provided to extend functions of the mobile terminal 100 to meet the user's demands for the diversified functions of the mobile terminal 100.

As the functions of the mobile terminal 100 are diversified, the battery 191 may be a replaceable type, as shown in FIG. 4, to supplement considerable power consumption of the mobile terminal 100. In case of the replaceable type battery, the battery loading part 104 may be formed on the surface off the rear case 102. In addition, a connecting terminal may be provided to the battery loading part 104 to be connected with a component installed inside the case.

Referring to FIG. 4, the USIM card loading part 105 or the memory card loading part 106 may be provided next to the battery loading part 104. Alternatively, the USIM card loading part 105 or the memory card loading part 106 may be provided to a bottom surface of the battery loading part 104. In this configuration, if the battery 191 is separated from the battery loading part 104, the USIM card loading part 105 or the memory card loading part 106 may be externally exposed. Hence, the battery loading part 104 may be enlarged to increase a size of the battery 191.

FIG. 4 shows that the USIM card loading part 105 or the memory card loading part 106 is provided a rear side of the rear case 102. Alternatively, the USIM card loading part 105 or the memory card loading part 106 may be provided a lateral side of the rear case 102 to enable a USIM card or a memory card to be loaded/unloaded via the lateral side of the rear case 102.

The rear cover 103 is configured to cover the surface of the rear case, thereby fixing the battery 191, the USIM card, the memory card and the like to the surface of the rear case 102. Hence, the battery 191, the USIM card, the memory card and the like are prevented from being separated from the rear case 102. Recently, as a waterproof function is added, the mobile terminal 100 may further include a waterproof structure configured to seal the mobile terminal 100. Hence, when the rear case 102 and the rear cover 103 are assembled together, the external components can be protected against water.

In the following description, embodiments of the above-configured mobile terminal 100 are explained with reference to the accompanying drawings.

Figure 5:
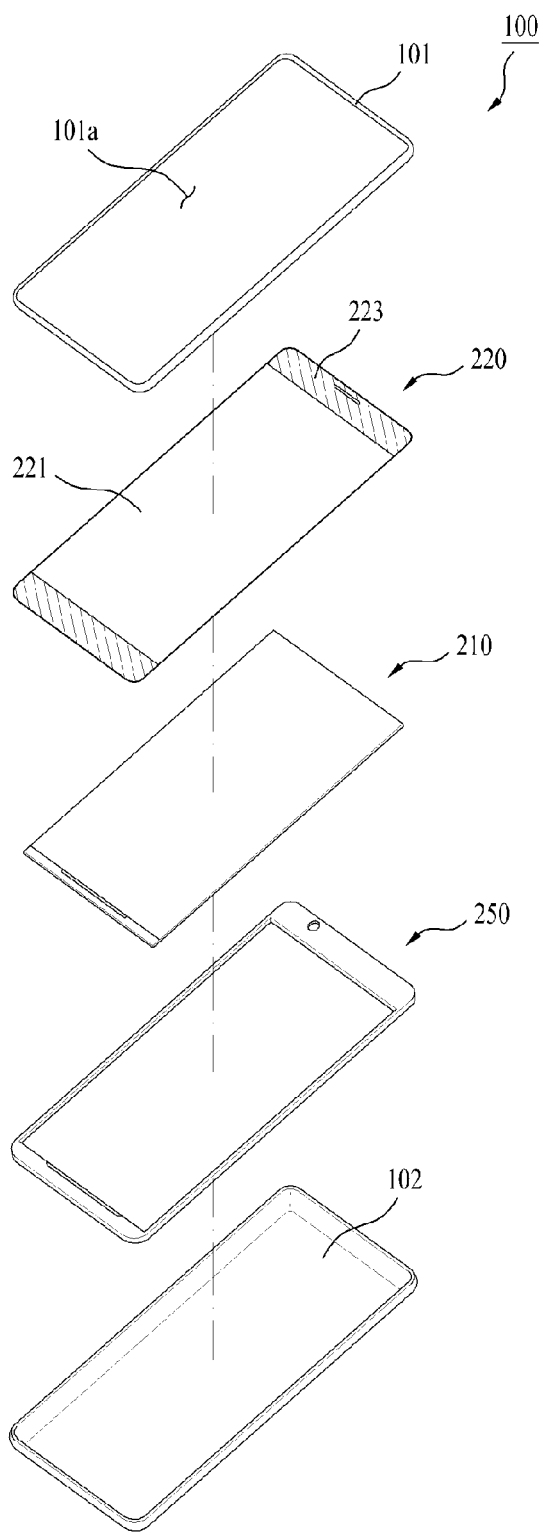
FIG. 5 is an exploded perspective diagram of a mobile terminal according to one embodiment of the present invention.
Figure 6:
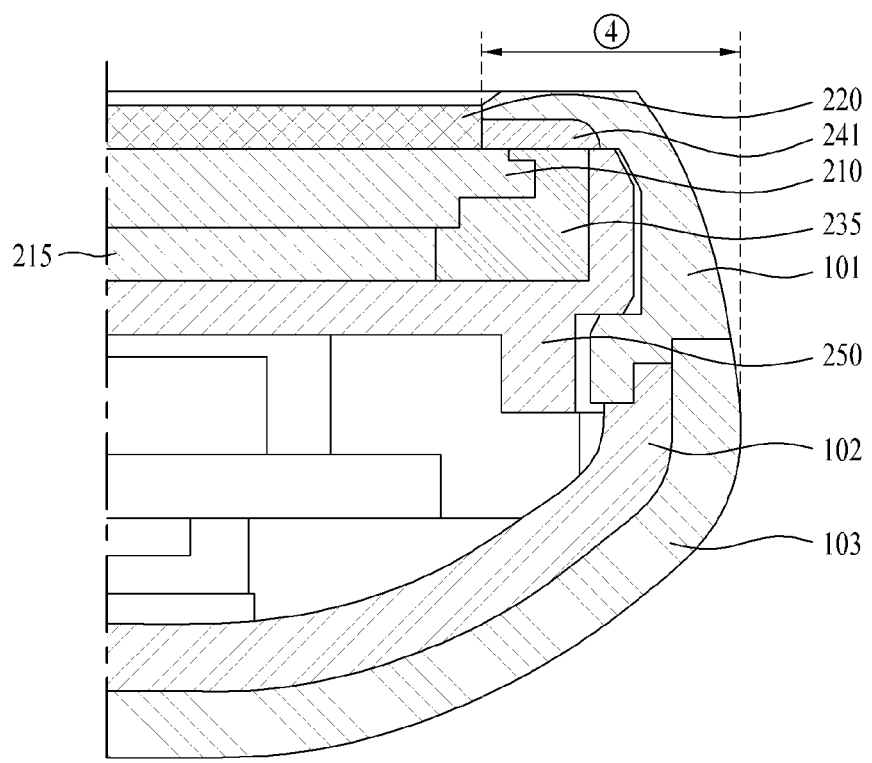
FIGS. 6 to 8 are cross-sectional diagrams of a mobile terminal according to one embodiment of the present invention.
Figure 7:
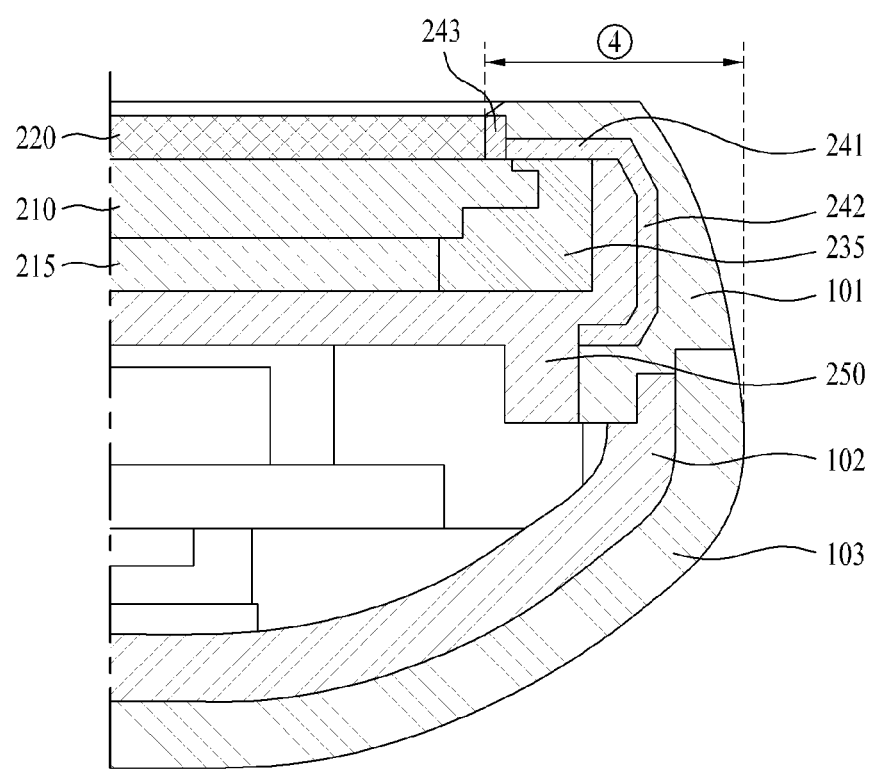
Figure 8:
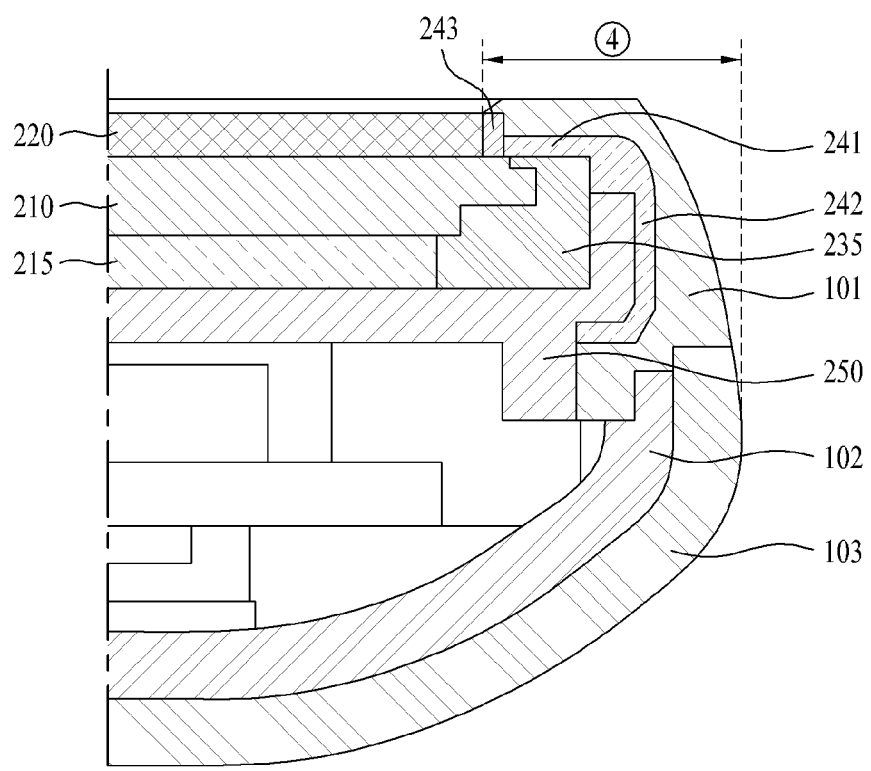

In particular, FIG. 5 is an exploded perspective diagram of the mobile terminal 100 according to one embodiment of the present invention and FIGS. 6 to 8 are cross-sectional diagrams of the mobile terminal 100 according to one embodiment of the present invention, in which the front case 101, rear case 102, a window layer 220, a touchscreen 210 and a frame 250 are shown.

The mobile terminal 100 according to a present embodiment is characterized in that right and left window bezels shown in FIG. 2 can be omitted from a front side of the mobile terminal 100. In more detail, a case includes the front case 101 configuring a front side and the rear case 102 configuring a rear side. In addition, the case may further include a middle case inserted between the front case 101 and the rear case 102 or the rear cover 103 configured to cover components loaded on a surface of the rear case 102.

The front case 101 is configured to form a front part of the case, in which electric/electronic components are loaded, of the mobile terminal 100. A perforated window 101a is provided to the front case 102 to have the touchscreen 210 arranged therein. In addition, the front case 101 provides a space for receiving the electric/electronic components together with the rear case 102 coupled with a rear side of the front case 101.

The touchscreen 210, which is a sort of the display unit 151, is arranged in the perforated window 101a provided to the front case 101. For a recent exterior of an all-in-one type, the audio module 152, the camera module 121 and the like are arranged in the perforated window 101a at the front side as well as the touchscreen 210. In addition, the perforated window 101a has an opening configured to oppose each necessary part of a window bezel 223 provided to the window layer 220 to separate each configuration.

The touchscreen 210 is coupled with an inside of the front case 101 to expose its front side via the perforated window 101a. The touchscreen 151 is characterized in outputting an image to play a role as the display unit 151 and receiving an input of a signal generated by a user's touch. In particular, the touchscreen 210 is capable of playing roles as input and output devices.

Figure 11:
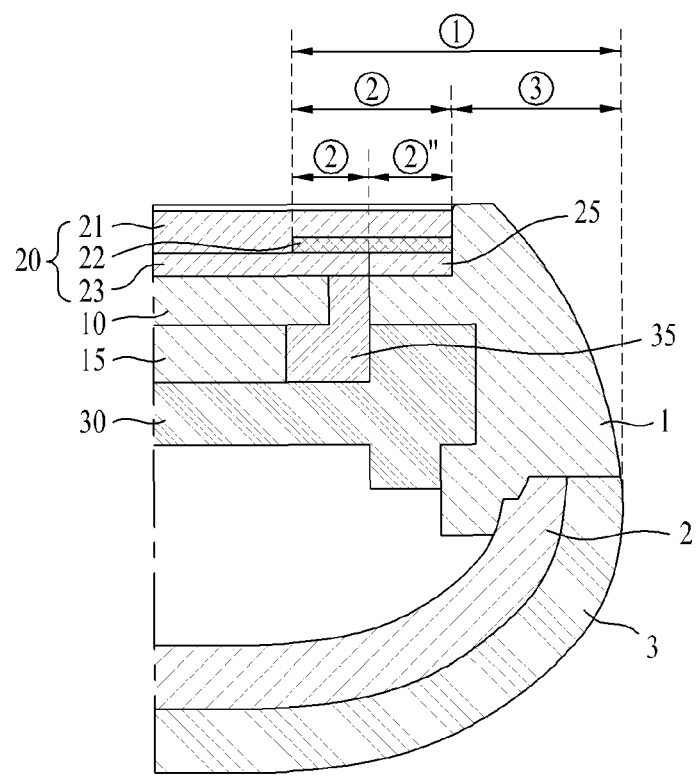
FIG. 11 is a cross-sectional diagram of a mobile terminal according to a related art.

FIG. 11 is a cross-sectional diagram of a mobile terminal according to a related art. Referring to FIG. 11, a touchscreen according to the related art generally includes an LCD panel 10 configured to output an image and a touch panel 23 attached to a front side of the LCD panel 10. The LCD panel 10 includes a color filter for outputting red, green and blue colors, liquid crystals and thin film transistors (TFT). In addition, the LCD panel 10 outputs various images by applying signals to the color filter.

In the touch panel 23, a film (e.g., ITO film) including a transparent electrode pattern made of a light-transmittive material is situated on the display unit and a data pattern connected to each transparent electrode pattern is formed on an edge of the touch panel 23. The touch panel 23 may be configured with one of a film, a sheet and the like and is attached to a front side of the LCD panel 10. Alternatively, the touch panel 23 can be built in one body 20 of a cover glass 21. Hence, the transparent electrode pattern and the data pattern of the touch panel 23 can be directly stacked on the cover glass 21.

Yet, as the data pattern formed on the edge of the touch panel 23 of the related art is made of opaque material, it causes a problem that a user can see the data pattern. To solve this problem, an opaque window bezel 22 is formed on the window layer to cover the data pattern.

Moreover, since the related art mobile terminal is assembled in a manner that the cover glass 21 including the touch panel 23 is attached to the front side of the case, as shown in FIG. 11, an adhesive tape 25 is required for this assembly. As the covering is performed using the adhesive tape 25 and the opaque window bezel 22, a size of the right and left window bezel 22 increases and an overall thickness of the mobile terminal increases.

Regarding the above-described structure of the related art mobile terminal, since a width ① amounting to a sum of a size ③ of the case 1 and a size ② of the window bezel 22 is necessary for both sides of the display unit, a size of the display unit is decreased in the mobile terminal.

Therefore, in order to increase the size of the display unit, the present embodiment omits the window bezel from right and left sides of the display unit using a novel arrangement of parts. In particular, the right and left side window bezel for covering the data pattern can be omitted using an in-cell type touchscreen 210 from which the opaque data pattern can be omitted.

According to the in-cell type touchscreen 210, because a touch function is added inside an LCD panel by adding a transparent electrode pattern of ITO to an LCD panel for outputting an image, a separate touch panel 23 is not needed on the LCD panel to implement a touchscreen 210 equipped with an image output function and a touch input function.

Using the in-cell type touchscreen 210, it is possible to reduce a thickness amounting to that of the related art touch panel 23 shown in FIG. 11 and to solve such a problem as a contrast ratio reduction, a luminance reduction, a surface reflection increase and the like due to the additionally stacked touch panel 23 of the related art, whereby the original property of the LCD panel can be maintained.

Further, because the in-cell type touchscreen 210 has the LCD panel equipped with a touch function, the opaque data pattern formed on the edge of the related art touch panel 23 is not required. In particular, the side window bezel 22 is unnecessary to cover the side data pattern.

Referring again to FIG. 5, the window layer 220 of the present invention is attached to a front side of the touchscreen 210 and may include the light-transmittive part 221 situated on a front side of an image output and touch input region (i.e., a display region) of the touchscreen 210 and the opaque bezel 223 provided to a top side and a bottom side of the light-transmittive part 221. Unlike the related art window layer 20, the window bezel 20 formed on the right and left sides of the related art mobile terminal can be omitted from the window layer 220 of the present invention.

The assembly structure of the mobile terminal 100 according to the present invention will now be described in detail with reference to FIG. 6. First of all, the touchscreen 210 of the present invention is wider than the perforated window 101a formed on the case 101. Referring to FIG. 6, since the touchscreen 210 is coupled with the perforated window 101a within the case 101, right and left end portions of the touchscreen 210 are coupled with right and left insides of the perforated window 101a of the case 101.

According to the related art, the adhesive tape 25 is used to prevent the window layer 20 attached to the front side of the case 1 from being lifted. Yet, according to the present invention, the related art adhesive tape 25 is omitted and a top side of the touchscreen 210 and an inner lateral side of the case 101 is fixed to each other by coming in contact with each other.

Moreover, because an in-cell type of the touchscreen 210 is used in the present invention, the opaque data pattern situated on the edge of the related art touch panel does not exist on the touchscreen 210 of the present invention. Therefore, the mobile terminal according to the present invention does not need to cover the right and left data pattern and the adhesive tape 25 as in the related art, thereby omitting the right and left window bezel 22.

However, despite the in-cell type touchscreen 210, an active area of the touchscreen 210 for outputting a screen actually is smaller than an overall size of the touchscreen 210. In order to cover an inactive area of the touchscreen 210 for not outputting a screen, referring to FIGS. 6 to 8, the case 101 may be configured to cover a circumference of the front side in part.

Compared to the related art, the present invention requires a bezel width ④ attributed to the case for a whole bezel on the side except the screen outputted part, whereby a total bezel size of the present invention is smaller that that of the related art.

The window layer 220 is attached to the front side of the touchscreen 210 in a manner of being inserted into the perforated window 101a. In particular, the window layer 220 has the same size of the perforated window 101a and may be substantially situated in the same plane of the case 101. As the window layer 220 is equal to the perforated window 101a in size, a width of the window layer 220 is smaller than that of the touchscreen 210 and a length of the window layer 220 is greater than that of the touchscreen 210.

Since the window layer 220 is coupled with the circumference of the perforated window 101a, a waterproof loop 243 may be further provided to a sidewall of the perforated window 101a coming in contact with the window layer 220. In particular, the waterproof loop 243 enables the window layer 220 to be stably fixed to the case 101 and prevents humidity and/or particles from entering a space between the window layer 220 and the case 101.

The window layer 220 is configured to extend in top and/or bottom direction to surpass the touchscreen 210. The window bezel 223 is formed on the top and/or bottom part of the window layer 220 surpassing the touchscreen 210 and then covers the audio module 152, the camera module 121 and the like inside to prevent from being externally exposed.

Optionally, the touchscreen 210 and the window layer 220 may be attached together via a transparent adhesive agent to configure built in one body. In this instance, it may be unnecessary to attach the adhesive tape of the related art to an end portion to fix the window layer 220 thereto. As the adhesive tape of the related art is not used, it may become advantageous in aspect of thickness and may be able to prevent the side window bezel from being increased unnecessarily.

Yet, because rear sides of the top and bottom parts of the window layer 220 are not supported by the touchscreen 210, they may be fixed to the case 101 or inner components using an adhesive tape to prevent from being lifted. Also, because the top and bottom parts of the window layer 220 include the bezel for the camera module 121, the audio module 152 and the like, there are margins for attaching the adhesive tape thereto.

The touchscreen 210 may further include a backlight unit 215 provided to a rear side of the touchscreen 210. The backlight unit 215 emits a white light to enable an image outputted from the touchscreen 210 to reach user's eyes. The light emitted from the backlight unit 215 implements various colors via the color filter of he touchscreen 210.

A screen holder 235 may be further provided to be coupled with the lateral sides of the backlight unit 215 and the touchscreen 210. The screen holder 230 couples the backlight unit 215 and the touchscreen 210 not to be separated from each other and also plays a role in cutting off light not to leak in directions except a direction of the touchscreen 210.

Optionally, it may be able to use a display unit of a hybrid type, in which the window layer 220, the touchscreen 210, the backlight unit 215 and the screen holder 235 are built in one body. If the members are built in one body, the display unit of the hybrid type can be fixed to the case 101 in a manner that right and left end portions of the touchscreen 210 are only fixed to inner surfaces of both sides of the perforated window 101a of the case 101.

The frame 250 is configured to support the rear side of the touchscreen 210 to enable the touchscreen 210 and the backlight unit 215 to be coupled with the front perforated window 101a of the case 101 by adhering close thereto without being lifted. A lateral side of the frame 250 is inserted in and fixed to a lateral recess 242 provided to the inner lateral side of the case 101. In particular, the frame 250 is locked with the case 101 by being fitted into the lateral recess 242.

Preferably, the lateral recess 242 is situated at a position for enabling the touchscreen 210 to adhere close to the perforated window 101a when the lateral side of the frame 250 is inserted in the lateral recess 242. In accordance with a shape of the frame 250, the lateral recess 242 may be configured to enable the frame 250 to be inserted therein (FIG. 7). Alternatively, when the frame 250 has a lateral side height smaller than that of the touchscreen 210 or the backlight unit 215, as shown in FIG. 8, it may come in contact with the screen holder 235 or the touchscreen 210 in part.

The frame 250 is coupled with the case 101 to enable the touchscreen 210 to be fixed to the front side of the case 101 by adhering closely and solidly thereto. In this instance, the frame 250 may be made of such a material as metal, reinforced plastics and the like.

In order to prevent the touchscreen 210 from being broken or damaged due to an external shock and the like, an elastic part 241 may be further provided to inner surfaces of both sides of the perforated window 101a on which the touchscreen 210 and the case 101 come in contact with each other.

The elastic part 241 may be formed along a whole circumference of the perforated window 101a or may be partially formed on right and left sides of the perforated window 101a coming in contact with the touchscreen 210 only. The elastic part 241 may be made of such a material as silicon and the like. When the case 101 is injection-molded by silicon double injection, the elastic part 241 may be formed in one body of the case 101 by partially injecting silicon.

Moreover, an elastic member may be provided to the lateral recess 242 in which the frame 250 and the case 101 are coupled locked with each other. If a size of the lateral recess 242 formed of such elastic member as silicon is set slightly smaller than that of the frame 250, when the frame 250 is locked in the lateral recess 242, the frame 250 and the lateral recess 242 can be coupled with each other more solidly.

The lateral recess 242 including the elastic member may be formed in one body of the aforementioned elastic part 241 and may be injection-molded into a shape matched to that of the frame 250. As mentioned in the foregoing description, since the waterproof loop 243 is formed of such elastic material as silicon, it may be formed in one body of the elastic part 241 and the lateral recess 242.

Figure 9:
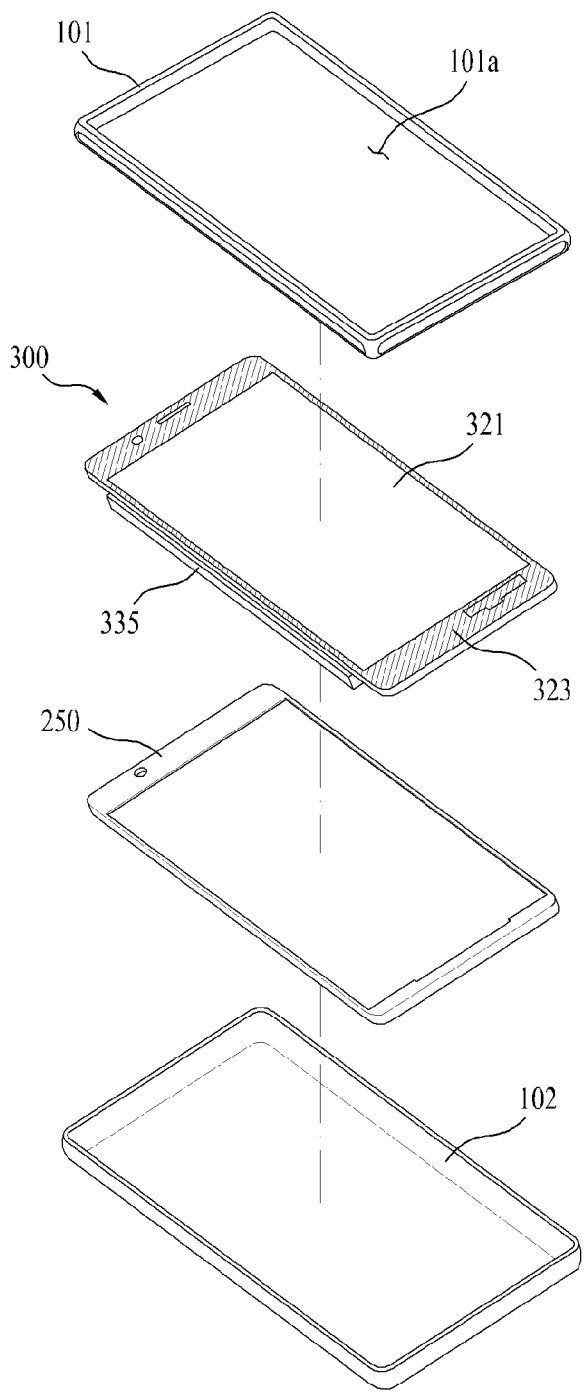
FIG. 9 is an exploded perspective diagram of a mobile terminal according to another embodiment of the present invention.
Figure 10:
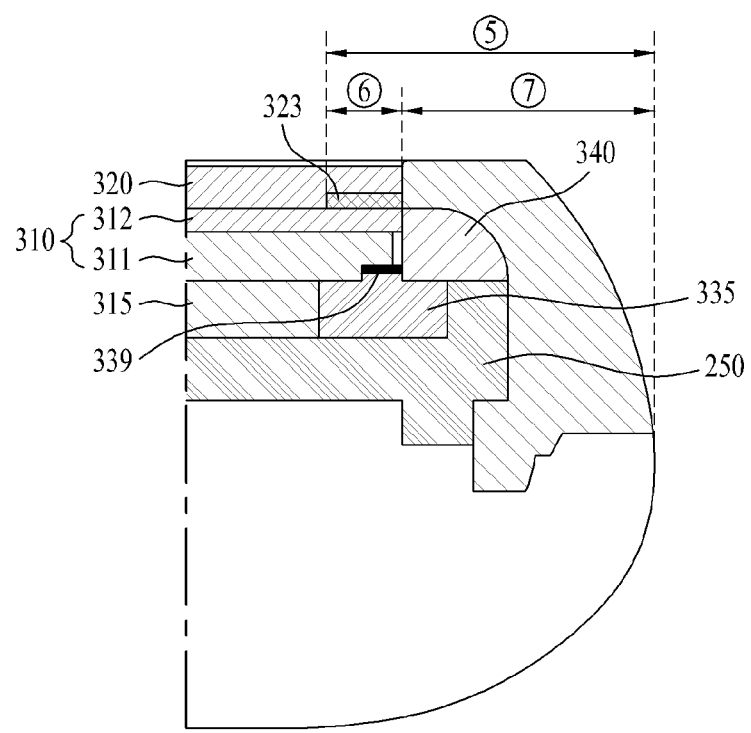
FIG. 10 is a cross-sectional diagram of a mobile terminal according to another embodiment of the present invention.

Next, FIG. 9 is an exploded perspective diagram of a mobile terminal according to another embodiment of the present invention and FIG. 10 is a cross-sectional diagram of a mobile terminal according to another embodiment of the present invention, in which a front case 101, a window layer 320, a touchscreen 310, a screen holder 335 and a frame 250 are shown. In the following description, another embodiment of the present invention is explained with reference to FIG. 9 and FIG. 10.

If a rear side of the touchscreen 310 is supported in a manner that a top side the screen holder 335 comes in contact with an inner surface of the perforated window 101a of the case, as shown in FIG. 10, the touchscreen 310 can be fixed to the perforated window 101a without an adhesive tape. Without covering then adhesive tape applied to the circumference of the display unit to fix the display unit of the related art mobile terminal shown in FIG. 11, the structure of the present embodiment is characterized in reducing a side window bezel size.

The front case 101 has a perforated window 101a formed on a front side of the front case 101 and forms an exterior of the mobile terminal 100. The touchscreen 310 is coupled with the case in a manner if being inserted in the perforated window 101a on an inner side of the case 101 and is capable of input and output both. For example, the touchscreen 310 may include an LCD panel 311 configured to output an image and a touch panel 312 attached to a front side of the LCD panel 311 to detect a user's touch.

The LCD panel 311 may include a color filter for outputting red, green and blue colors, liquid crystals and thin film transistors (TFT). In addition, the LCD panel 311 outputs various images by applying signals to the color filter. In the touch panel 312, a film (e.g., ITO film) including a transparent electrode pattern made of a light-transmittive material is situated at a position corresponding to the display unit and a data pattern connected to each transparent electrode pattern is formed on an edge of the touch panel 312. The touch panel 23 may be configured with one of a film, a sheet and the like.

The right and left window bezel 323 is situated over the opaque data pattern to cover the data pattern not to be viewed by a user. The touch panel 312 may be built in one body of the window layer 320 on the front side, as shown in FIG. 10, in a manner of stacking the transparent electrode pattern of the touch panel 312 on the window layer 312. Moreover, the touch panel 312 and the LCD panel 311 may be attached not to be separated from each other using a transparent adhesive agent. In particular, it may be able to use a member of a hybrid type in which the window layer 320, the touch panel 312 and the LCD panel 311 are formed on one body.

In another example of the touchscreen 310, it may be able to use a touchscreen 310 of an in-cell type having the touch panel 312 implemented on the LCD panel 311. According to the in-cell type touchscreen 210, because a transparent electrode pattern of a touch panel is added to an LCD panel for an image output, it may be unnecessary to stack a separate touch panel 312 on the LCD panel 311.

Using the in-cell type touchscreen 210, an overall thickness can be reduced than that of a case of using the LCD panel 311 and the touch panel 312 respectively. In addition, such a problem as a contrast ratio reduction, a luminance reduction, a surface reflection increase and the like due to the touch panel 312 additionally stacked on the LCD panel 312 can be solved, whereby the original property of the LCD panel can be maintained.

Since the LCD panel is equipped with a touch function above all, the opaque data pattern formed on the circumference of the touch panel 312 formed separately from the LCD panel 311 is not required, it may be able to further decrease the right and left window bezel size. A backlight unit 215 may be further provided to a rear side of the LCD panel 311 to supply light to the LCD panel 311.

A screen holder 335 is coupled with the lateral sides of the LCD panel 311 and the backlight unit 315. The screen holder 335 couples the LCD panel 311 and the backlight unit 315 not to be separated from each other and also plays a role in cutting off light emitted from the backlight unit 315 not to be projected in directions except a direction of the LCD panel 311.

The screen holder 335 may be formed by injection molding of plastics and the like. In addition, the screen holder 335 may be made of a material more resistant to shock than that of the touchscreen 310 or the window layer 320.

The screen holder 335 may be configured to fully cover a lateral side of the LCD panel 311. Alternatively, the screen holder 335 may be configured to partially cover the lateral side of the LCD panel 311, as shown in FIG. 10. Alternatively, the screen holder 335 may be coupled with a bottom circumference of the LCD panel 311. The screen holder 335 may include an outer holder part configured to extend outward to surpass the LCD panel 311.

A cutoff layer 339 may be further provided between the screen holder 335 and the LCD panel 311 to prevent light from leaking out of the backlight unit 315. The window layer 320 of the present embodiment is coupled with a front side of the touchscreen 310 and may include a light-transmittive part 321 corresponding to a display area and a window bezel 323 having an opaque material printed thereon to cover a circumference of the light-transmittive part 321.

Compared to the right/left window bezel (22, see FIG. 11) of the related art, the window bezel 323 of the present embodiment is characterized in securing a larger display area by decreasing a size of the right/left window bezel 323.

In the structure of the related art mobile terminal shown in FIG. 11, the window layer 21, the touch panel 23 and the LCD panel 10 are stacked on one another. In this structure, the window layer 21 is formed larger than the LCD panel 100 and is then coupled on the front side 1 of the case 1. Moreover, a circumference of the window layer 21 and a front side of the perforated window of the case 1 are attached to each other via the adhesive tape 25.

In this structure, the window bezel 22 of the window layer 21 needs a width enough to cover the data pattern of the touch panel 23 and the adhesive tape 25. A width ②" of the adhesive tape 25 amounts to about 0.8 mm~1.0 mm and a width ②' of the data pattern of the touch panel amounts to about 1.3 mm~1.5 mm. Hence, when the window layer 21 is coupled on the front side of the case 1 of the related art mobile terminal, the width ② of the right/left window bezel 22 in this structure occupies about 2.1 mm~2.5 mm.

Yet, according to the present invention, the window layer 320 is inserted in an opening instead of being coupled on the front side of the case 101 and an inner circumference of the perforated window 101a comes in contact with a top side of the outer holder part of the screen holder 335.

In doing so, the window layer 320 and the touchscreen 310 may be formed in one body in a manner of being attached to each other via a transparent adhesive agent. Since the screen holder 335 is caught on the inner circumference of the perforated window 101a, the window layer 320 is not lifted or separate from the case 101 despite that right and left sides of the window layer 320 are not attached to the case 101 via the adhesive tape.

When the window layer 320 is coupled on the top side of the touchscreen 310, since each of the window layer 320 and the touchscreen 310 is made of a fragile material, if an external shock is applied to the mobile terminal, the window layer 320 or the touchscreen 310 may be broken or damaged. Therefore, the window layer 320 or the touchscreen 310 may be preferably coupled with the screen holder 335.

Yet, if a shock is applied, the screen holder 335 may be separated. In order to raise stability, an elastic part 340 may be provided to the inner circumference of the perforated window 101a of the case 101, i.e., to the part contacted with the screen holder 335. The elastic part 340 absorbs external shock to prevent the screen holder 335 from being broken or to prevent the screen holder 335 from being separated from the touchscreen 310 or the backlight unit 315. The elastic part 340 may use such an elastic material as silicon and the like. In addition, the elastic part 340 may be formed in one body of the case 101 by silicon double injection.

As this structure does not need the adhesive tape 25 of the related art, the right/left window bezel 323 just needs to cover the data line of the touch panel 320. Hence, a width ⑥ of the window bezel 323 may be set to about 1.3 mm~1.5 mm. Compared to the related art, the present invention reduces the size of the right/left window bezel 323 by about 1 mm.

A frame 250 may be further included in order to support the rear side of the touchscreen 310. In particular, the frame 250 may enable the touchscreen 310 and the backlight unit 315 to be coupled with the front perforated window 101a of the case 101 by adhering close thereto without being lifted. The frame 250 is coupled with the case 101 to enable the touchscreen 310 to be fixed to the front side of the case 101 by adhering closely and solidly thereto. In this instance, the frame 250 may be made of such a material as metal, reinforced plastics and the like.

In order to fix the screen holder 335 to the frame 250, at least one of an adhesive agent, an adhesive tape and the like may be provided between the frame 250 and the screen holder 335.

Accordingly, embodiments of the present invention provide various effects and/or features.

First of all, according to at least one of embodiments of the present invention, a window bezel provided to a lateral side to cover electrode lines and adhesive tapes of a related art touch panel is downsized or completely omitted.

Secondly, according to at least one of embodiments of the present invention, a size of a display unit in a mobile terminal can be increased to be viewed by a user.

Thirdly, according to at least one of embodiments of the present invention, a degree of freedom can be raised in aspect of design.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal, comprising:
a case having electronic components loaded therein and having a perforated window formed on a front side;
a touchscreen coupled with the case and having a front side exposed via the perforated window, the touchscreen being configured to output an image and to receive an input touch signal;
a window layer coupled with the front side of the touchscreen, the window layer including a light transmitting part situated in front of an image output and touch input area of the touchscreen and an opaque window bezel disposed only on top and bottom sides of the light-transmittive part; and
an elastic part within an inner surface of the case on both sides of the perforated window,
wherein right and left end portions of the front side of the touchscreen contact the elastic part.

2. The mobile terminal of claim 1, wherein the touchscreen includes a Liquid Crystal Display (LCD) panel including a color filter, liquid crystals and thin film transistors, and also includes a transparent electrode pattern for receiving a touch input.

3. The mobile terminal of claim 1, wherein the elastic part is formed in one body of the case by silicon double injection.

4. The mobile terminal of claim 1, wherein the window layer includes an extending part extending in top or bottom directions to surpass the touchscreen, and wherein the window bezel covers the extending part of the window layer.

5. The mobile terminal of claim 1, wherein the window layer is equal to the perforated window in size, and
wherein the window layer is inserted in the perforated window and situated in a same plane of the case.

6. The mobile terminal of claim 5, further comprising:
a waterproof loop on a sidewall of the perforated window contacted with the window layer.

7. The mobile terminal of claim 1, further comprising:
a backlight unit coupled with a rear side of the touchscreen; and
a screen holder configured to cover lateral sides of the backlight unit and the touchscreen.

8. The mobile terminal of claim 1, wherein the window layer and the touchscreen are coupled with each other using a transparent adhesive agent.

9. The mobile terminal of claim 1, further comprising:
a frame having the touchscreen loaded therein to enable the touchscreen to adhere close to the perforated window of the case by being locked with the case.

10. The mobile terminal of claim 9, wherein a lateral recess configured to have an end portion of the frame fitted therein is formed on each of both sides of an inner surface of the case, and
wherein the frame is fitted into the lateral recess so as to be locked with the case.

11. The mobile terminal of claim 9, wherein the lateral recess comprises an elastic member.

12. A mobile terminal, comprising:
a case having electronic components loaded therein and having a perforated window formed on a front side;
a touchscreen inserted in the perforated window and having a front side exposed via the perforated window, the touchscreen being configured to output an image and to receive an input touch signal;
a window layer inserted in the perforated window by being coupled with the front side of the touchscreen, the window layer including a light transmitting part situated in front of an image output and touch input area of the touchscreen, and a window bezel covering a circumference of the light-transmittive part and including an opaque material; and
a screen holder coupled with a circumference of the touchscreen and having an outer holder part extending outward to surpass the circumference of the touchscreen,
wherein a top side of the outer holder part contacts an inner surface of the case on both sides of the perforated window.

13. The mobile terminal of claim 12, further comprising:
an elastic part formed on the inner surface of the case on both sides of the perforated window contacted with the top side of the outer holder part.

14. The mobile terminal of claim 13, wherein the elastic part is formed in one body of the case by silicon double injection.

15. The mobile terminal of claim 12, wherein the touchscreen comprises a touch panel on a front side of the touchscreen and an LCD panel on a rear side of the touchscreen, and
wherein the touch panel and the LCD panel are coupled in one body with each other via a transparent adhesive agent.

16. The mobile terminal of claim 15, wherein the touch panel comprises a data pattern formed of an opaque material, and
wherein the window bezel on a right and left side corresponds to a width of a part of the touch panel having the data pattern formed thereon.

17. The mobile terminal of claim 12, wherein the touchscreen comprises an LCD panel including a color filter, liquid crystals and thin film transistors and also includes a transparent electrode pattern for receiving a touch input.

18. The mobile terminal of claim 12, further comprising:
a backlight unit coupled with a rear side of the touchscreen,
wherein the screen holder is coupled with a circumference of the backlight unit and a circumference of the touchscreen.

19. The mobile terminal of claim 12, wherein the touchscreen and the window layer are coupled with each other using a transparent adhesive agent.

20. The mobile terminal of claim 12, further comprising:
a frame configured to support a rear side of the touchscreen to enable the touchscreen to adhere close to the perforated window of the case.

* * * * *